United States Patent [19]

Onodera et al.

[11] Patent Number: 4,908,677

[45] Date of Patent: Mar. 13, 1990

[54] METHOD OF EXAMINING THE STATES OF ALIGNMENT OF GLASS FIBERS OF A PAIR OF RIBBON FIBER CABLES

[75] Inventors: Tsutomu Onodera; Takeshi Yamada, both of Sakura, Japan

[73] Assignee: Fujikura Ltd., Tokyo, Japan

[21] Appl. No.: 229,625

[22] Filed: Aug. 8, 1988

[30] Foreign Application Priority Data

Aug. 14, 1987 [JP] Japan ................................. 62-202942
Aug. 14, 1987 [JP] Japan ................................. 62-202943

[51] Int. Cl.$^4$ ...................... G01B 11/27; G01N 21/84
[52] U.S. Cl. .................................. 356/73.1; 356/153;
356/399
[58] Field of Search ...................... 356/73.1, 153, 390,
356/399

[56] References Cited

U.S. PATENT DOCUMENTS

| | | | |
|---|---|---|---|
| 4,613,214 | 9/1986 | Brugger et al. ..................... | 356/73.1 |
| 4,660,972 | 4/1987 | Rossberg et al. ................... | 356/73.1 |
| 4,725,297 | 2/1988 | Grigsby et al. ........................ | 65/4.2 |

FOREIGN PATENT DOCUMENTS

| | | | |
|---|---|---|---|
| 030617 | 6/1981 | European Pat. Off. | |
| 186819 | 8/1986 | European Pat. Off. | |
| 2855598 | 7/1980 | Fed. Rep. of Germany | 356/73.1 |
| 60-70407 | 4/1985 | Japan | 356/73.1 |

*Primary Examiner*—Vincent P. McGraw

*Attorney, Agent, or Firm*—Frishauf, Holtz, Goodman & Woodward

[57] ABSTRACT

In a method of examining the states of alignment of glass fibers in a pair of ribbon fiber cables by observing their images obtained in two directions, a reflecting mirror is located adjacent to glass fibers of a pair of ribbon fiber cables. Illuminating light is introduced into the glass fibers of the fiber cables in a direction different from the normal direction of a plane formed by the glass fibers, and an image formed by the illuminating light which is reflected by the reflecting mirror and then passed through the glass fibers and another image formed by the illuminating light which is passed through the glass fibers and then reflected by the reflecting mirror are observed. According to the examining method, the optical axes of two images obtained on the light receiving side can be made parallel to each other to keep the two images extremely near to each other. Therefore, the distance along which the pickup system must be moved can be made short. This makes the system small-sized and the image processing time short. In addition, the objective used in the pickup system, may have a low magnification. Further, all of the glass fibers can be observed once on a screen and the adjustment of focus relative to the glass fibers may be conducted one time when they are observed in each of two directions. Furthermore, their shift from that axis along which they should be aligned can be detected with a higher accuracy.

11 Claims, 12 Drawing Sheets

METHOD OF EXAMINING THE STATES OF ALIGNMENT OF GLASS FIBERS OF A PAIR OF RIBBON FIBER CABLES

BACKGROUND OF THE INVENTION

1. Field of the Invention

The present invention relates to a method of examining the states of alignment of glass fibers of a pair of ribbon fiber cables by observing the images of the glass fibers obtained in two directions.

2. Description of the Related Art

When a pair of ribbon fiber cables are to be connected to each other, protecting covering on the portions of optical fibers of the fiber cables, which are adjacent to endfaces of the optical fibers to be connected, are removed so that glass portions i.e., glass fibers are exposed. These glass fibers are fitted into V-shaped grooves on a pair of blocks, each having the same number of V-shaped grooves as that of the glass fibers in each of the fiber cables, in such a way that the glass fibers in one fiber cable fitted into the V-shaped grooves on one block are opposed to their paired glass fibers in the other fiber cable fitted into the V-shaped grooves on the other block. It is confirmed whether or not the glass fibers in one fiber cable are aligned with those in the other fiber cable, and they are then connected to each other.

The reason why the states of alignment of glass fibers of the fiber cables are examined is that the paired glass fibers opposed to each other are shifted from each other to their complete connection to be expected when the glass fibers are incompletely fitted into the V-shaped grooves, the glass fibers are incompletely exposed, as naked optical fibers, and something thus remains on their naked portions, or something like dust is left in the V-shaped grooves.

In the case of the single optical fiber, the conventional examination is carried out according to the method of observing an image obtained by viewing the state of alignment of glass fibers of fiber cables in one direction or images obtained by viewing it in two directions which are perpendicular to each other.

The conventional method of observing the image viewed in one direction can be applied to the ribbon fiber cables. However, it can be detected with considerable accuracy according to this method how the paired glass fibers are shifted from that axis along which they should be aligned in a direction perpendicular to the optical axis of illuminating light incident into them, but their shift from that axis in the same direction as the optical axis of illuminating light is detected with a large error. This makes the conventional method difficult to be employed.

On the other hand, the method of observing images viewed in two directions can be applied to the ribbon fiber cables with high detecting accuracy In the case of the ribbon fiber cables, however, illuminating light can be entered into the glass fibers in a direction normal to that plane on which the glass fibers are arranged side by side, but it cannot be entered into them in a direction perpendicular to the normal direction (or in that direction in which they are arranged side by side). It is therefore needed that the two directions in which illuminating light is entered into the glass fibers are determined to shift from the direction perpendicular to the normal direction as well as from the normal direction. Therefore, the following method can be used. Two light sources are used and they are entered into the glass fibers in these two directions which are shifted from the normal direction and also from the direction perpendicular to the normal direction. In this method, however, the space between two images obtained on the light receiving side by the pickup system (objective, television camera and the like) is large. In other words, the distance along which the system must be moved is relatively long. This causes the system to be bulky and complicated. In addition, the image processing time is long.

SUMMARY OF THE INVENTION

The present invention is therefore intended to eliminate the above-mentioned drawbacks, and the object of the present invention is to provide a method of examining the states of alignment of glass fibers of a pair of ribbon fiber cables by observing the images of the glass fibers obtained in two directions.

According to the present invention, there is provided, in a method of examining the states of alignment of glass fibers in a pair of ribbon fiber cables by observing their images obtained in two directions, said method comprising locating a reflecting mirror adjacent to glass fibers of a pair of ribbon fiber cables which are to be connected with each other, introducing illuminating light into the glass fibers of the fiber cables in a direction different from the normal direction of a plane formed by the glass fibers, and observing an image formed by the illuminating light which is reflected by the reflecting mirror and then passed through the glass fibers and another image formed by the illuminating light which is passed through the glass fibers and then reflected by the reflecting mirror.

According to the present invention, there is further provided, in a method of examining the states of alignment of glass fibers of a pair of ribbon fiber cables by observing their images obtained in two directions, said method comprising, locating a reflecting mirror adjacent to glass fibers of a pair of ribbon fiber cables which are to be connected with each other, introducing a first illuminating light into the glass fibers of the fiber cables in the normal direction of a plane on which the glass fibers are arranged side by side or in a direction different from the normal direction, introducing a second illuminating light into the glass fibers of the fiber cables in another direction different from the normal direction, and observing an image formed by the first illuminating light which is passed through the glass fibers and then reflected by the reflecting mirror and another image formed by the second illuminating light which is only passed through the glass fibers.

With the present invention, the optical axes of two images obtained on the light receiving side can be made parallel to each other to keep these two images extremely near to each other. Therefore, the distance along which the pickup system must be moved can be made short. This makes the system compact and the image processing time short. In addition, the objective used in the pickup system may have a low magnification. Further, all of the glass fibers can be observed once on a screen and the adjustment of focus relative to the glass fibers may be conducted one time when they are observed in each of two directions. Furthermore, their shift from that axis along which they should be aligned can be detected with a higher accuracy.

DETAILED DESCRIPTION OF THE PREFERRED EMBODIMENTS

Figure 1:
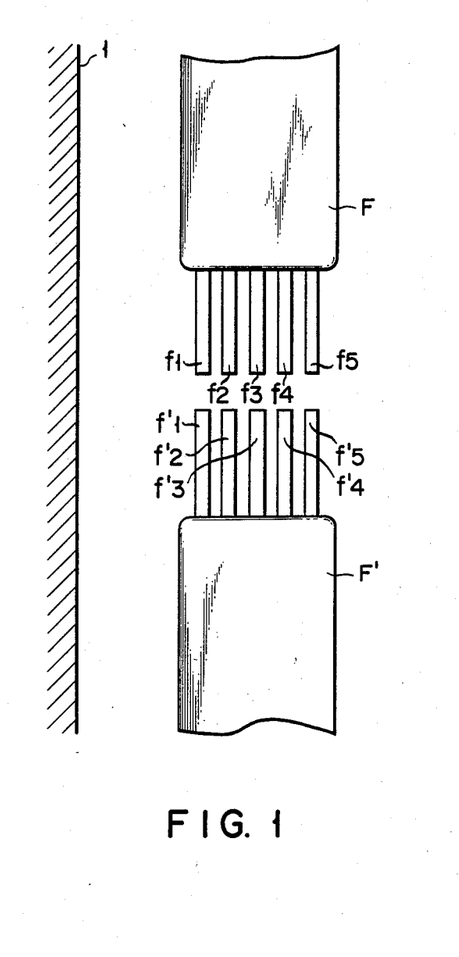
FIG. 1 is a view showing a pair of ribbon fiber cables to be connected to each other and a reflecting mirror positioned near the fiber cables.
Figure 2:
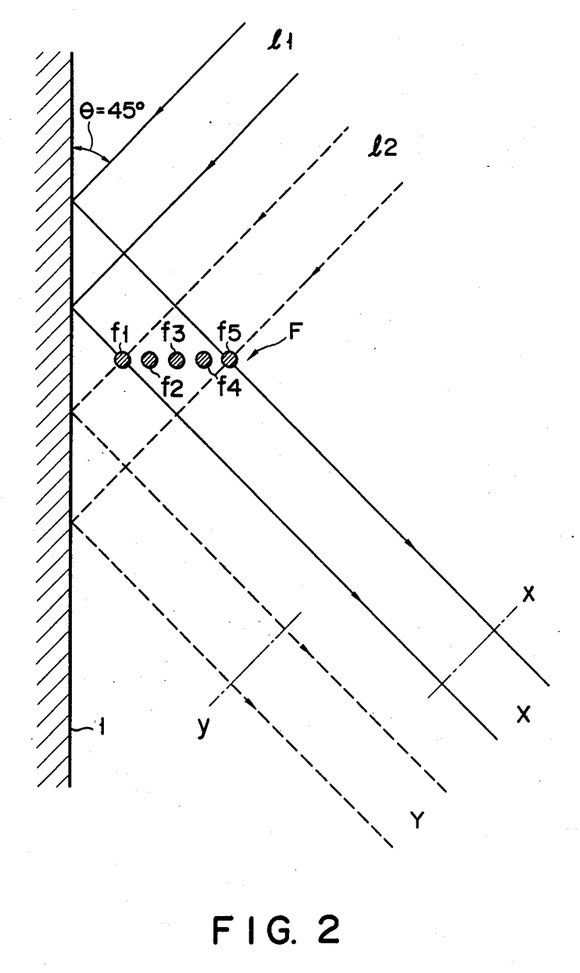
FIG. 2 is a view roughly showing a method of examining the states of alignment of glass fibers of a pair of ribbon fiber cables according to the present invention.

A pair of ribbon fiber cables F and F' to be connected are positioned to face each other as shown in FIG. 1. Fiber cable F comprises fine glass fibers $f_1$-$f_5$, and fiber cable F' also comprises fine glass fibers $f_1'$-$f_5'$. In order to achieve the observation of the glass fibers in two directions which enables the moving distance of the pickup system including objectives, a television camera and the like to be made short, as shown in FIG. 2, illuminating lights 11 and 12 are directed in one direction shifted from the normal direction of a plane which is formed by the glass fibers of the fiber cables (only glass fibers $f_1$-$f_5$ of fiber cable F is shown in FIG. 1 for the sake of simplicity), and reflecting mirror 1 is located adjacent to the fiber cables and on a plane parallel to that plane which is formed by the normal direction and the direction in which the glass fibers are extended. End faces of glass fibers $f_1$-$f_5$ to be connected are shown in FIG. 1. Illuminating light 11 is reflected by reflecting mirror 1 and then passed through glass fibers $f_1$-$f_5$ to form image X, while illuminating light 12 is passed through glass fibers $f_1$-$f_5$ and then reflected by reflecting mirror 1 to form image Y. Images X and Y thus formed are observed via a microscope (not shown).

In FIG. 2, illuminating direction of lights 11 and 12 is slanted by 45° from the normal direction relative to a plane which is formed by glass fibers $f_1$-$f_5$, and the number of the cores of the fiber cable F is five. Needless to say, the number of the glass fibers is not limited to five. Characters x and y in FIG. 2 represent those positions where an objective of a microscope which is focused on a common line perpendicular to both of the X and Y images forming lights is selectively located.

Figure 3:
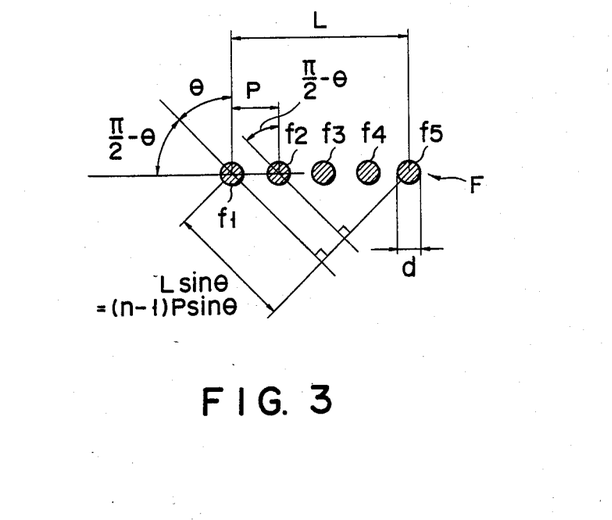
FIG. 3 shows a line of glass fibers of the ribbon fiber cables and illuminating light.

When the objective is fixed at one of these positions and glass fibers $f_1$-$f_5$ of fiber cable F are observed, the position at which each of the glass fibers is focused is different from those of the others. Providing that the width of the lines of the glass fibers of fiber cable F in the direction in which they are arranged side by side be denoted by L, the angle formed by the normal direction of a plane which is formed by glass fibers $f_1$-$f_5$ and by the optical axis of illuminating lights be denoted by $\theta$, and the interval between two adjacent glass fibers be denoted by P, the diameter of a glass fiber be denoted by d, the difference of those distances which are needed to focus images of two adjacent glass fibers is $P \sin \theta$, and difference of those distances which are needed to focus images of two outermost glass fibers is $L \sin \theta$, as shown in FIG. 3.

Figure 4:
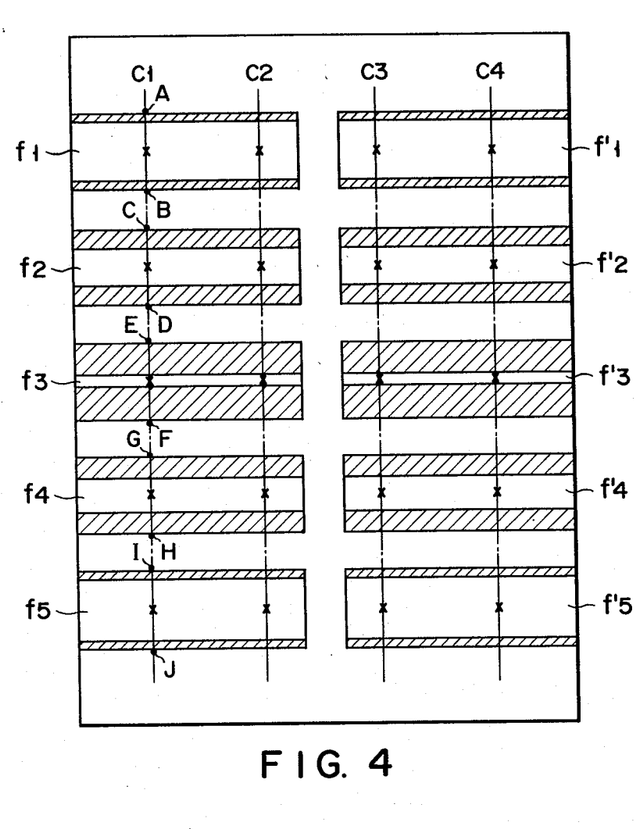
FIG. 4 shows an image on a line of the glass fibers of a pair of the ribbon fiber cables which are to be connected to each other.

The images of the glass fibers of fiber cable F in direction X picked up by a microscope are as shown in FIG. 4, in which images $f_1$-$f_5$ correspond to glass fibers $f_1$-$f_5$, and images $f_1'$-$f_5'$ correspond to glass fibers $f_1'$-$f_5'$.

Figure 5:
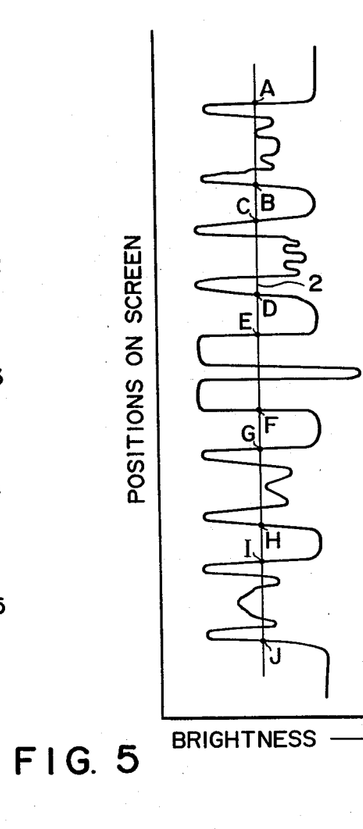
FIG. 5 shows a distribution of brightness which corresponds to the image on cursor $C_1$ shown in FIG. 4.

When each of image signals is A/D-converted at its position on cursor $C_1$ shown in FIG. 4, the brightness distribution curve of each of images $f_1$-$f_5$ on cursor $C_1$ is as shown in FIG. 5. Points A, B, C, --- I, J of the brightness curve crossing threshold brightness 2 shown by a solid line in FIG. 5 correspond to the ends A. B. C. --- I, J of the diameters of glass fibers $f_1$-$f_5$ in FIG. 4. Therefore, the ends A, B, C, --- I, J of the diameters of the glass fibers are obtained from the brightness curve. The centers of the diameters of the glass fibers correspond to the centers of the pairs of A and B, C and D, E and F, G and H, and I and J. Therefore, the centers of the diameters of the glass fibers can be obtained from positions A, B, C, --- I, J on cursor $C_1$.

Similarly, the brightness distribution of images $f_1$-$f_5$ on cursor $C_2$ and those of images $f_1'$-$f_5'$ on cursors $C_3$ and $C_4$ are obtained. The ends of the diameters of the glass fibers $f_1$-$f_5$ on cursor $C_2$ and the ends of the diameters of glass fibers $f_1'$-$f_5'$ on cursors $C_3$ and $C_4$ are obtained from these brightness distributions. The centers of the diameters of the glass fibers can be obtained from the diameter ends.

Based on data of the diameter centers of glass fibers $f_1$-$f_5$ thus obtained on cursors $C_1$ and $C_2$ and data of the diameter centers of glass fibers $f_1'$-$f_5'$ also obtained on cursors $C_3$ and $C_4$, center lines of the glass fibers $f_1$-$f_5$ and $f_1'$-$f_5'$ are determined, and the shift of the center line of one of the paired glass fibers opposed to the other is then obtained. In other words, their center shifts $\Delta X_1-\Delta X_5$ are obtained A, B, C, --- I and J on the brightness distribution can be selected from the plural crossing points of the brightness distribution, because the intervals of crossing points A and B, C and D, E and F, G and H, and I and J correspond to the diameters of glass fibers $f_1-f_5$.

The detecting operation of these center shifts is conducted about image Y to obtain $\Delta y_1-\Delta y_5$. Center shifts $\Delta D_1-\Delta D_5$ of the paired glass fibers opposed to each other are calculated from $\Delta D_i = \sqrt{\Delta x_i^2 + \Delta y_i^2}$ (i=1~5). When images Y of glass fibers $f_1-f_5$ are displayed on the television screen in the order of $f_1, f_2, --- f_5$, images X of them are turned upside down and displayed in the order of $f_5, f_4, --- f_2, f_1$, as understood from FIG. 2.

When the above-described method of the present invention is used, the center shifts of glass fibers $f_1-f_5$ in multi-core optical fiber cable F can be detected only by adjusting the focusing distance of their image X one time and that of their image Y one time.

It will be described under what condition the center shifts of the glass fibers can be obtained only by adjusting the focusing distance one time.

Figure 6:
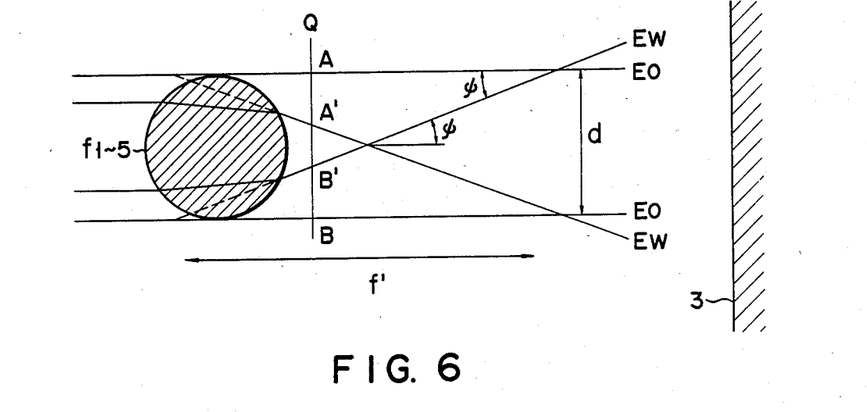
FIG. 6 shows the relation between the glass fiber and the illuminating light.

The illuminating light beams passing through glass fibers $f_1-f_5$ advance as shown in FIG. 6. Illuminating light beams $E_o$ passing aside each of glass fibers $f_1-f_5$ advance straight onto objective 3 and illuminating light beams $E_w$ passing through each of them are refracted two times at the border of each of them with air and then reach objective 3. Those light beams of the illuminating light beams passing through each of glass fibers $f_1-f_5$ which can enter objective 3 are limited by the effective diameter and the angular apertures of objective 3. When objective 3 has a sufficiently large effective diameter, the light beams incident onto objective 3 are limited only by the angular aperture of objective 3 and those light beams which are represented by $E_w$ in FIG. 6 are critical ones. When, for example, images are focused onto position Q in FIG. 6, $\overline{AA'}$ and $\overline{BB'}$ represent black portions in image while $\overline{A'B'}$ denotes a bright portion therein, and A and B represent both ends of the diameter of the glass fiber.

In order to accurately obtain the center on the diameter of each of glass fibers $f_1-f_5$, it is needed that both diameter ends A and B in FIG. 6 are accurately obtained from the brightness distribution of each of the fiber image and the range of focusing position which enables these both ends A and B of the diameter to be obtained is represented by f' in FIG. 6. Providing that the diameter of each of the glass fibers be represented by d and the angular aperture of objective 3 by $\phi$, focusing position range f' can be expressed by:

$$f' = d/\tan \phi \quad (1)$$

Width L of the line of glass fibers in fiber cable F in the direction in which they are arranged side by side can be calculated as follows when the interval of the two adjacent glass fibers is denoted by P and the number of the glass fibers by n:

$$L = (n-1)P \quad (2)$$

Difference f of those positions at which the images of the glass fibers are focused can be calculated as follows from angle 8 which is defined, as shown in FIG. 3, by the normal direction to the plane formed by glass fibers $f_1-f_5$ and the optical axis of the illuminating light:

$$f = (n-1)P \sin \theta \quad (3)$$

In order to accurately obtain both ends of the diameter of each of the glass fibers from their images focused at one position, the following is needed:

$$f \leq f' \quad (4)$$

and accordingly, $$\tan \phi \leq d/\{(n-1)P \sin \theta\} \quad (5)$$

When $\theta = 45°$, n=5, P=250 μm and d=125 μm, for example, $\tan \phi \leq 0.176$. When this is represented by angular aperture NA of the of the objective, $NA \leq 0.173$. Tests were conducted using an objective whose NA is 0.1 and inventors of the present invention have confirmed that the center on the diameter of each of glass fibers $f_1-f_5$ can be detected fixing the focusing position of their images.

Critical angle $\theta_0$ of incident light which enables the center on the diameter of each of the glass fibers to be obtained will be asked. If expressed in other words, $\theta_0$ is an angle at which the center lines of two adjacent ones of glass fibers $f_1-f_5$ are overlapped one upon the other. Angle $\theta$ which enables the center on the diameter of each of the glass fibers to be obtained and which is formed by the normal direction of a plane formed by glass fibers $f_1-f_5$ and by the optical axis of the illuminating light is expressed as follows:

$$0 < \theta < \theta_0 \quad (6)$$

Figure 7:
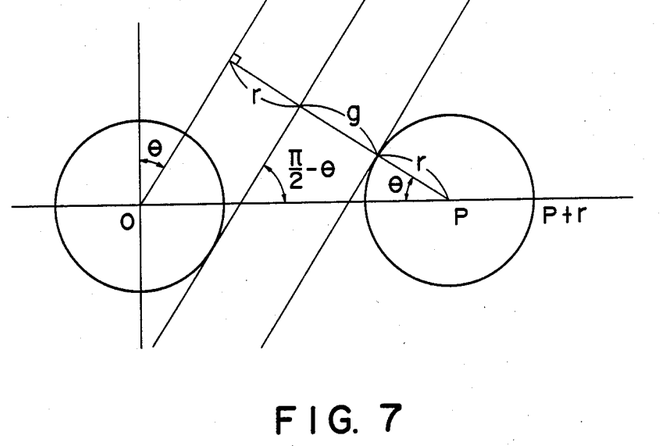
FIG. 7 is intended to explain the relation between two adjacent glass fibers and the angle of illuminating light incident into them.

As shown in FIG. 7, providing that the radius of each of glass fibers $f_1-f_5$ be denoted by r, the interval of two adjacent glass fibers by P and the angle at which the illuminating light enters onto the mirror by $\theta$, space g of the two adjacent glass fibers can be obtained as follows:

$$g = P \cos \theta - 2r \quad (7)$$

When $g=0$, $\theta = \theta_0$. Therefore, $\theta_0$ can be calculated as follows:

$$\cos \theta_0 = 2r/P \quad (8)$$

When r=62.5 μm and P=250 μm, $\theta_0 = 60°$ because $\cos \theta_0 = \frac{1}{2}$. Therefore, $0 < \theta < 60°$. Namely, critical incident angle $\theta_0$ becomes 60°.

Errors caused when center shift l is measured according to the above-described examining method will be discussed.

Figure 8:
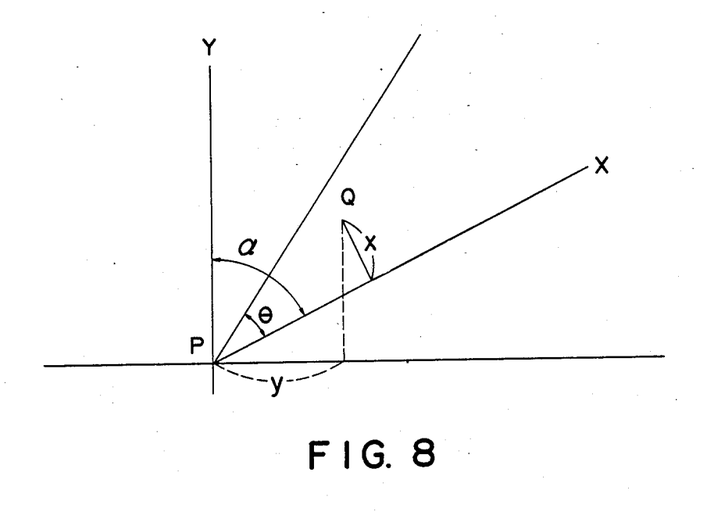
FIG. 8 is intended to explain errors caused when it is measured how the paired glass fibers are shifted from that axis along which they should be aligned.

When the angle of the illuminating light entering onto the mirror is $\theta$, an angle formed by two optical axes of the illuminating light becomes $2\theta$. When two points P and are observed at angle $2\theta$, as shown in FIG. 8, length from p to Q can be expressed as follows, providing that the distance along which point Q is observed from direction X be denoted by x, the distance along which point Q is observed from direction Y by y and angle $\alpha$ between X and Y equal to $2\theta$:

$$l = \sqrt{y^2 + (x/\sin \alpha + y/\tan \alpha)^2} \quad (9)$$

Center shift l is obtained from observing distances x and y as follows: $l = f(x, y)$. When observing distances x and y have errors $\sigma_x$ and $\sigma_y$, error $\sigma_L$ of center shift l can be expressed as follows according to the rule of error propagation:

$$\sigma_L^2 = \left(\frac{\partial l}{\partial x}\right)^2 \sigma_x^2 + \left(\frac{\partial l}{\partial y}\right)^2 \sigma_y^2 \qquad (10)$$

Observation errors caused when a television camera and the like are used are equal to each other. Providing that $\sigma_x = \sigma_y = \sigma_E$, therefore, $$\left(\frac{\sigma_L}{\sigma_E}\right)^2 = \left(\frac{\partial l}{\partial x}\right)^2 + \left(\frac{\partial l}{\partial y}\right)^2 = \qquad (11)$$

$$\frac{1}{l^2}\left[\frac{1}{\sin^2 \alpha}\left(\frac{x}{\sin \alpha} + \frac{y}{\tan \alpha}\right)^2 + \left\{y + \frac{1}{\tan \alpha}\left(\frac{x}{\sin \alpha} + \frac{y}{\tan \alpha}\right)\right\}^2\right]$$

Figure 9:
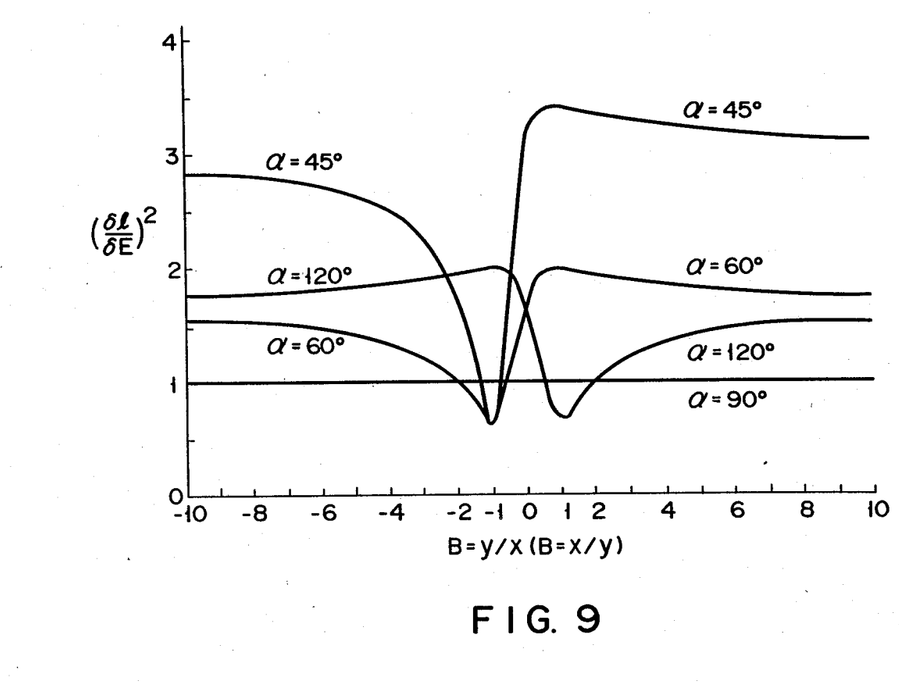
FIG. 9 shows the relation between the angle formed by two optical axes of illuminating light and the measuring errors.

When the ratio of distances x and y observed from two directions is that B=y/x (x≠0), $$\left(\frac{\sigma_L}{\sigma_E}\right)^2 = \frac{1 + \cos^2 \alpha}{\sin^2 \alpha} + \frac{2B\cos \alpha}{B^2 + 2B\cos \alpha + 1} \qquad (12)$$

and this becomes same even when B=x/y. When angle α formed by two optical axes of the light beams equals to ±90° in equation (12), $$\left(\frac{\sigma_L}{\sigma_E}\right)^2 = 1$$

and it therefore becomes certain, as shown in FIG. 9 and $\sigma_L$ becomes equal to $\sigma_E$ regardless of the ratio of observing distances x and y. When α≠±90°, $(\sigma_L/\sigma_E)^2$ takes maximum or minimum value at B=±1. More specifically, it takes the maximum value at B=+1 and the minimum value at B=−1 when α=45° and 60°. It also takes the maximum value at B=−1 and the minimum value at B=+1 when α=120°. When B=±∞, it is a function gradually approaching the value obtained at B=0.

Points observed are uniformly distributed on plane X−Y. Therefore, average measuring error $\overline{\sigma_L}$ of center shift relating to angle formed by two optical axes of the light beams can be expressed as follows:

$$\left(\frac{\overline{\sigma_L}}{\sigma_E}\right)^2 = \lim_{B_o \to \infty} \frac{1}{2B_o} \int_{-B_o}^{B_o} \left(\frac{\sigma_L}{\sigma_E}\right)^2 dB = \frac{1 + \cos^2 \alpha}{\sin^2 \alpha} \qquad (13)$$

Figure 10:
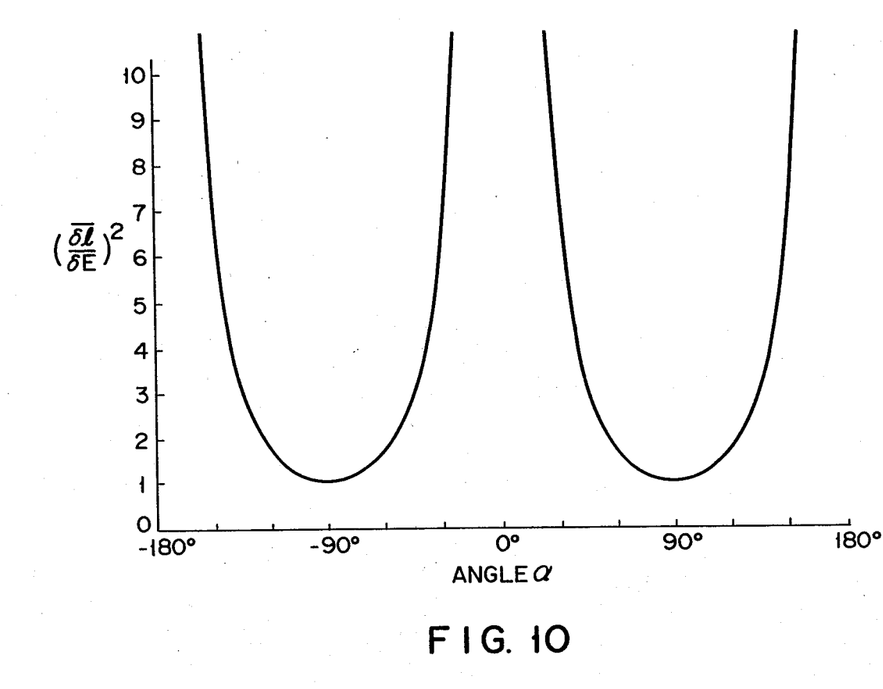
FIG. 10 shows the relation between the angle formed by two optical axes of illuminating light and an average measuring error.

This average error $(\overline{\sigma_L}/\sigma_E)^2$ changes like a reverse parabola, as shown in FIG. 10, relative to angle formed by two observing optical axes and becomes the minimum value of 1 when α=±90°. Therefore, angle θ at which each of illuminating lights 11 and 12 enters onto mirror 1 is in the range of 0<θ<60°, as described above, when diameter d of each of glass fibers $f_1$-$f_5$ equals to 125 μm and interval P between two adjacent glass fibers equals to 250 μm, and the measuring error becomes minimum when α=2θ=90° or θ=45°. The maximum center shift $l_{max}$ observed at this time is obtained from the space between two adjacent glass fiber expressed by equation (7) and $l_{max}$=P cos θ−2r ≈51.7 μm. This is sufficiently practical.

Figure 11:
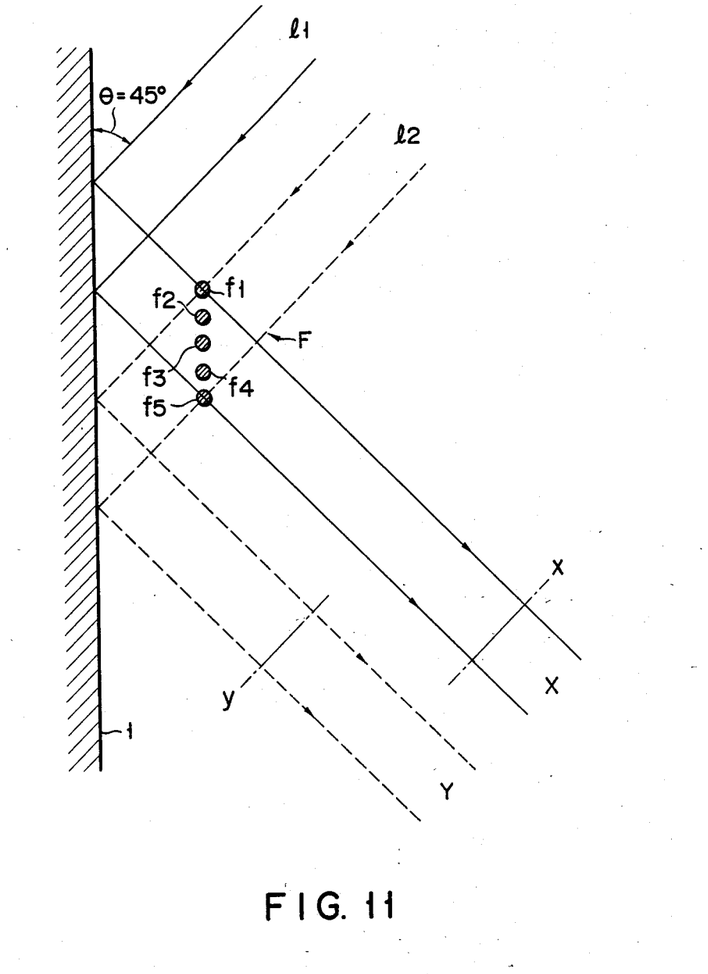
FIG. 11 is a view roughly showing the method of examining the states of alignment of glass fibers of a pair of ribbon fiber cables according to the present invention in a case where the direction in which the glass fibers in the ribbon fiber cables are arranged side by side is different from that shown in FIG. 2.

In the case of the above-described embodiment of the present invention, reflecting mirror 1 has been positioned parallel to a plane which is formed by the normal direction of a plane formed by glass fibers $f_1$-$f_5$ in ribbon fiber cable F and by the direction in which the glass fibers are extended. However, as shown in FIG. 11, reflecting mirror 1 may be positioned parallel to the plane formed by glass fibers $f_1$-$f_5$, so that glass fibers $f_1$-$f_5$ may be illuminated by illuminating lights 11 and 12 in one direction different from the normal direction of a plane formed by glass fibers $f_1$-$f_5$, and same merits as those achieved by the abovedescribed embodiment can be attained.

According to the above-described method of examining aligned states of the glass fibers of ribbon fiber cables, all of the glass fibers in the fiber cables can be observed on a screen. In addition, the objective used in the pickup system may have a low magnification. Further, center shift can be detected with accuracy. Still further, when the center shift of each of the glass fibers is to be detected in one direction, the adjustment of that position at which fiber images are focused may be made one time. Still further, the interval between images X and y of the glass fibers can be made extremely short, because the light beams by which images X and y are formed are parallel to one another. The moving distance of the pickup system can be thus made short, thereby enabling the time of detecting the center shift to be shortened and the system to be smallsized.

Figure 12:
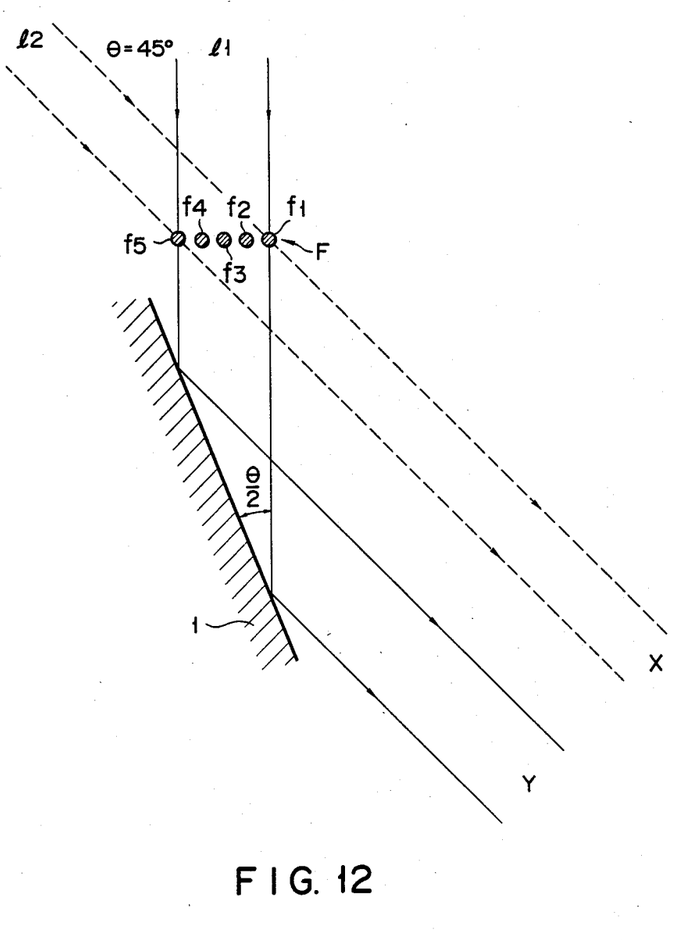
FIG. 12 is a view roughly showing a further method of examining the states of alignment of glass fibers of a pair of ribbon fiber cables according to the present invention.

FIG. 12 shows another example of the examining method according to the present invention wherein reflecting mirror 1 is located on the line extending through the glass fibers, which is in the normal direction of a plane formed by glass fibers $f_1$-$f_5$ in ribbon fiber cable F. Reflecting mirror 1 extends in the direction in which glass fibers $f_1$-$f_5$ are extended, and inclined by θ/2 with regard to the normal direction of the plane formed by glass fibers $f_1$-$f_5$, where θ denotes an angle defined between two illuminating light beams 11 and 12. Illuminating light 11 is introduced onto glass fibers $f_1$-$f_5$ in the normal direction of the fiber plane and illuminating light 12 is introduced in a direction shifted from the above normal direction onto glass fibers $f_1$-$f_5$, whereby image Y formed by illuminating light 11 which is passed through the optical fibers and then reflected by reflecting mirror 1 and image X formed by illuminating light 12 which is passed through the glass fibers are observed by a microscope (not shown).

In order that the lights which form two images X and y through the pickup system are made parallel to each other, reflecting mirror 1 may be located in such a way that the angle of illuminating light 11 incident upon reflecting mirror 1 is θ/2. When glass fibers $f_1$-$f_5$ are observed, their images Y formed by illuminating light 11 entering in the normal direction of the plane of the fibers are focused on a line substantially perpendicular to light 11, but their image X formed by illuminating light L2 entering in a direction shifted from the normal direction is not focused on a line perpendicular to light 12 and their focused positions are thus shifted from one another.

Providing that the width of glass fibers $f_1$-$f_5$ in fiber cables F in the direction in which they are arranged side by side be represented by L, the angle of the optical axis of illuminating light relative to the normal direction of the plane of the glass fibers by $\theta$, and the interval between two adjacent glass fibers by P, difference in distances needed to focus two adjacent fiber images is $P \sin \theta$ and difference in distances needed to focus the outermost two fiber images is $L \sin \theta$. Character d represents the diameter of each of the glass fibers. The focused positions of two adjacent glass fibers are shifted by $P \sin \theta$ from each other in the passing direction of light.

Figure 13:
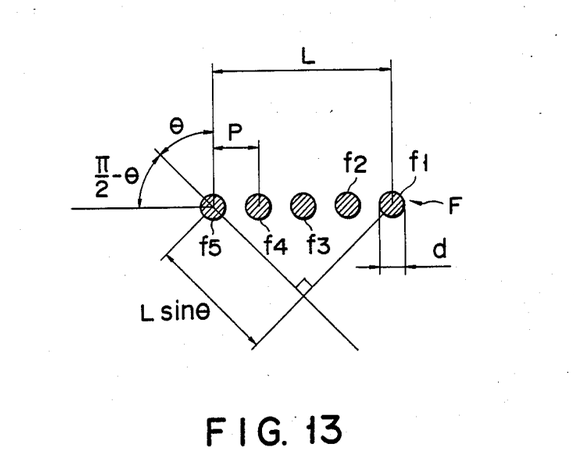
FIG. 13 shows a line of glass fibers of the ribbon fiber cables and illuminating light.

When images X of glass fibers $f_1$-$f_5$ are observed from above in the order of $f_1$, $f_2$, --- $f_5$, their images Y are turned upside down and observed from above in the order of $f_5$, $f_4$, --- $f_1$, as apparent from FIG. 13.

When the above-described method is used, center shift of glass fibers $f_1$-$f_5$ in ribbon fiber cable F can be detected only by adjusting the focused position one time of their images X and also one time of their images Y.

Same thing as that made relating to the embodiment of the present invention shown in FIG. 1 to FIG. 6 can be said of the conditions which enable center shift to be detected and of critical angle $\theta_0$ of incident light which enables the center on the diameter of each of glass fibers to be obtained. Therefore, description on these conditions and angle will be omitted.

Figure 14:
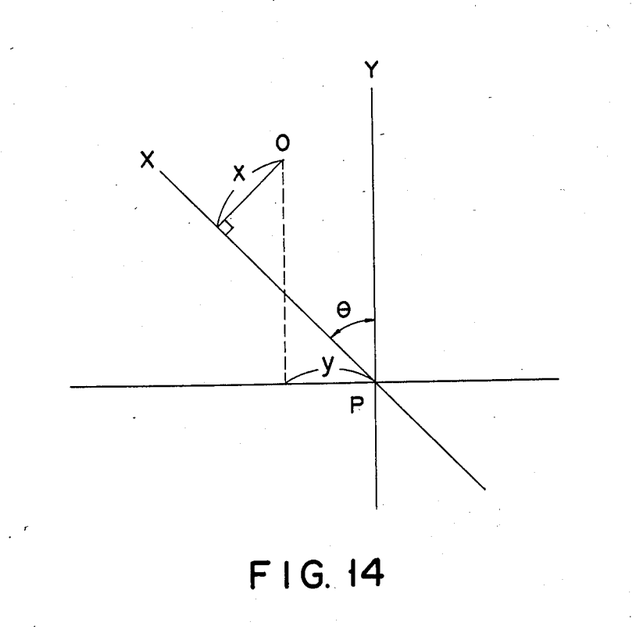
FIG. 14 is intended to explain errors caused when it is measured how the paired glass fibers are shifted from that axis along which they should be aligned.

That description which has been made relating to the embodiment of the present invention shown in FIG. 1 to FIG. 6 can also be applied to the measuring error of center shift l when angle $\alpha$ cited with reference to the embodiment shown in FIG. 1 to FIG. 6 is replaced by $\theta$, as shown in FIG. 14. Description on the measuring error of center shift will be omitted accordingly.

Angle $\theta$ formed by two optical axes becomes $0 < \theta < 60°$ when diameter d of each of glass fibers $f_1$-$f_5$ equals to 125 $\mu$m and interval P between two adjacent glass fibers equals to 250 $\mu$m. The average measuring error of center shift is minimum when the angle $\theta = \pm 90°$. Therefore, within the applicable range of angle $\theta$, $0 < \theta < 60°$, it is advantageous to adopt a larger angle from the viewpoint of measuring error. However, the maximum center shift $l_{max}$ which can be measured gets smaller as the angle $\theta$ is larger.

As an example, the case where $\theta = 45°$ as in FIG. 12 is considered. The maximum center shift $l_{max}$ which can be measured at this time can be expressed as follows: $l_{max} = P \cos \theta - 2r \approx 51.7$ $\mu$m. This is sufficiently large.

Average $\overline{\sigma_L}$ of the measuring errors can be attained from $(\overline{\sigma_L}/\sigma_E)^2 = 3$. $\overline{\sigma_L} = \sqrt{3} \; \sigma_E \approx 1.73 \; \sigma_E$. The maximum measuring error $\sigma_L$ max is as follows when B in equation (12) equals to 1:

$$\left(\frac{\sigma_{L\,max}}{\sigma_E}\right)^2 = \frac{1}{1 - \cos \theta} = 2 + \sqrt{2} \qquad (10)$$

Therefore, $\sigma_{L\,max}$ 1.85 $\sigma_E$ and if $\sigma_E < 0.54$ $\mu$m, the measuring error can be made smaller than 1 $\mu$m. Angular $\theta$ can be made nearer to 90° as the ratio of diameter d of each of the glass fibers and interval P between two adjacent glass fibers becomes larger. This is advantageous.

Figure 15:
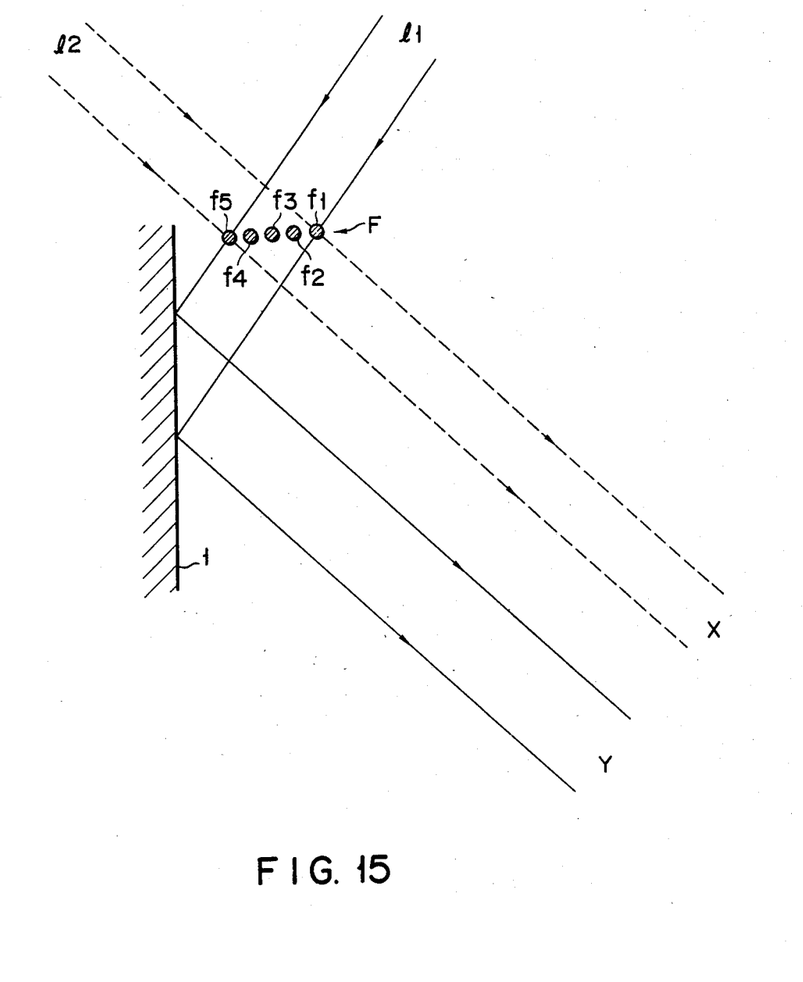
FIG. 15 is a view roughly showing a still further method of examining the states of alignment of glass fibers of a pair of ribbon fiber cables according to the present invention.
Figure 16:
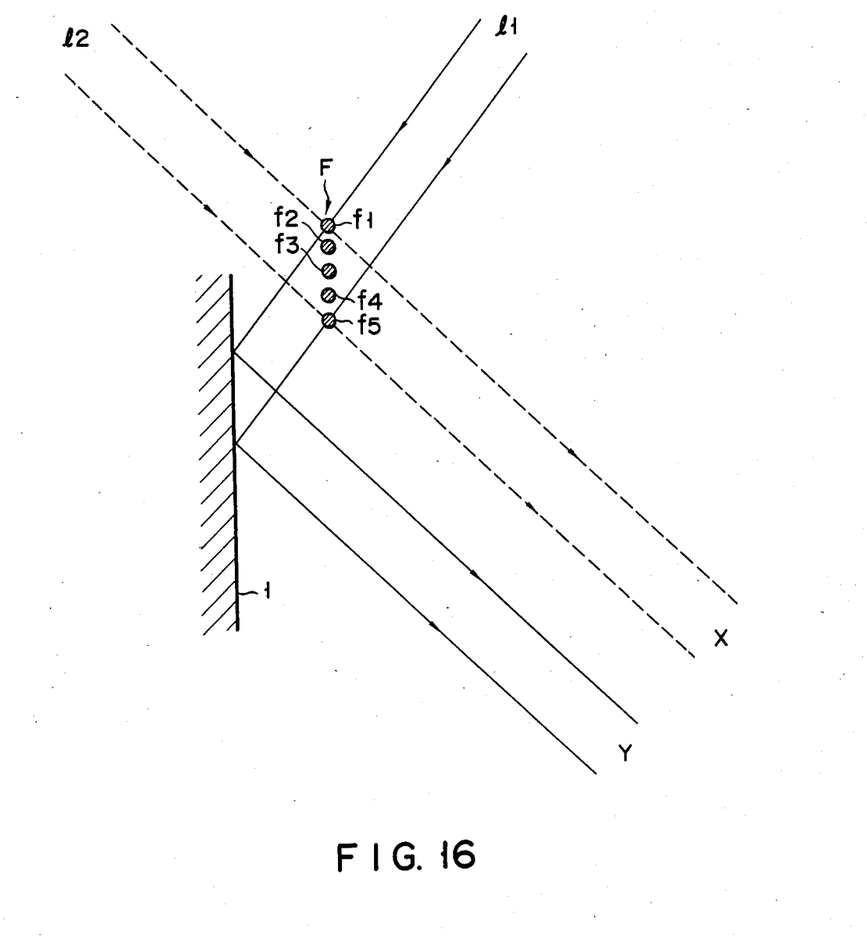
FIG. 16 is a view roughly showing a yet further method of examining the states of alignment of glass fibers of a pair of ribbon fiber cables according to the present invention.

In the case of the embodiment shown in FIG. 12, reflecting mirror 1 has been located on the line extending through the glass fibers, which is in the normal direction of a plane formed by glass fibers $f_1$-$f_5$ in ribbon fiber cable F. However, the position of reflecting mirror 1 is not limited to this. As shown in FIG. 15, for example, reflecting mirror 1 may be located parallel to a plane defined by the normal direction of the plane of the glass fibers and the direction in which the glass fibers are extended, so that illuminating light 11 is passed through glass fibers $f_1$-$f_5$ and then reflected by reflecting mirror 1 to form images Y of these glass fibers and illuminating light 12 which is only passed through the glass fibers to form their images X. Reflecting mirror 1 may also be located parallel to the plane of the glass fibers, as shown in FIG. 16, so that illuminating light 11 is passed through glass fibers $f_1$-$f_5$ and then reflected by reflecting mirror 1 to form images Y of the glass fibers and illuminating light 12 is only passed through the glass fibers to form their images X. In any of these cases, illuminating light 11 which is passed through the glass fibers and then reflected by reflecting mirror 1 serves as light for forming images Y while illuminating light 12 which is only passed through the glass fibers serves as light for forming images x. These embodiments also enable same merits as those achieved by the already-described embodiments to be attained.

What is claimed is:

1. A method of examining the states of alignment of glass fibers contained, respectively, in a pair of ribbon fiber cables by observing their images obtained in two directions, said method comprising:
    locating a reflecting mirror adjacent to glass fibers of a pair of ribbon fiber cables which are to be connected with each other,
    introducing illuminating light into the glass fibers of the fiber cables in a direction different from a direction normal to a plane formed by the glass fibers; and
    observing for each glass fiber an image formed by the illuminating light which is reflected by the reflecting mirror and then passed through an individual glass fiber and another image formed by the illuminating light which is passed through the individual glass fiber and then reflected by the reflecting mirror.

2. The method according to claim 1, wherein said reflecting mirror is located on a plane which extends in the direction in which the glass fibers extend and which is perpendicular to a plane on which the glass fibers are arranged side by side.

3. The method according to claim 1, wherein said reflecting mirror is located on a plane which is parallel to a plane on which the glass fibers are arranged side by side.

4. The method according to claim 1, wherein said observing is performed using an object lens in which $\tan \phi \leq d/\{(n-1)P \sin \theta\}$,
    where,
        $\phi$ is the angular aperture of the object lens,
        d is a diameter of each of the fibers,
        n is the number of fibers,
        P is a pitch between the adjacent fibers, and
        $\theta$ is an angle between the optical axis of the illuminating light and the plane formed by the fibers.

5. The method according to claim 1, in which 0 satisfies the following inequality:

$$0 < \theta < \theta_O$$

where,
    $\theta_O$ is a critical value of the angle between the optical axis of the illuminating light and the plane formed by the fibers, $$\cos \theta_0 = 2r/P,$$

r is a radius of each of the fibers, and

P is a pitch between the adjacent fibers.

6. A method of examining the states of alignment of glass fibers containing, respectively, in a pair of ribbon fiber cable by observing their images obtained in two directions, said method comprising;

locating a reflecting mirror adjacent to glass fibers of a pair of ribbon fiber cables which are to be connected with each other, introducing a first illuminating light into the glass fibers of the fiber cables in the normal direction of a plane on which the glass fibers are arranged side by side or in a direction different from the normal direction;

introducing a second illuminating light into the glass fibers of the fiber cables in another direction different from the normal direction; and observing an image formed by the first illuminating light which is passed through each individual glass fiber and then reflected by the reflecting mirror and another image formed by the second illuminating light which is only passed through the individual glass fibers.

7. The method according to claim 6 wherein said reflecting mirror is located at a predetermined angle relative to that direction in which the glass fibers are arranged side by side.

8. The method according to claim 6 wherein said reflecting mirror is located on a line extending through the glass fibers and in the normal direction of the plane on which the glass fibers are arranged side by side.

9. The method according to claim 6 wherein said reflecting mirror is located in a direction parallel to that direction in which the glass fibers are arranged side by side.

10. The method according to claim 4, wherein said observing is performed using an object lens in which $\tan \phi \leq d/\{(n-1)P \sin \theta\}$, where, $\phi$ is the angular aperture of the object lens, d is a diameter of each of the fibers, n is the number of fibers, P is a pitch between the adjacent fibers, and $\theta$ is an angle between the optical axis of the illuminating light and the plane formed by the fibers.

11. The method according to claim 6, in which $\theta$ satisfies the following inequality:

$$0 < \theta < \theta_0$$

where, $\theta_0$ is a critical value of the angle between the optical axis of the illuminating light and the plane formed by the fibers, $\cos \theta_0 = 2r/P$, r is a radius of each of the fibers, and p is a pitch between the adjacent fibers.

* * * * *